United States Patent [19]

Okamoto et al.

[11] Patent Number: 4,616,740

[45] Date of Patent: Oct. 14, 1986

[54] MAGNETIC PARTICLE TYPE ELECTROMAGNETIC COUPLING APPARATUS

[75] Inventors: Kiyohide Okamoto, Himeji; Ryosuke Okita, Aioi, both of Japan

[73] Assignee: Mitsubishi Denki Kabushiki Kaisha, Tokyo, Japan

[21] Appl. No.: 685,795

[22] Filed: Dec. 24, 1984

[30] Foreign Application Priority Data

Dec. 26, 1983 [JP] Japan .................. 58-249072

[51] Int. Cl.⁴ .................. F16D 37/02; F16D 3/12; F16D 3/66
[52] U.S. Cl. .................. 192/21.5; 192/84 E; 192/106.2
[58] Field of Search ............ 192/21.5, 106.2, 84 E

[56] References Cited

U.S. PATENT DOCUMENTS

| | | | |
|---|---|---|---|
| 2,870,888 | 1/1959 | Gill, Jr. | 192/21.5 |
| 3,014,566 | 12/1961 | Jaeschke | 192/21.5 |
| 3,176,809 | 4/1965 | Monroe | 192/21.5 X |
| 3,249,184 | 5/1966 | Simons et al. | 192/21.5 |
| 3,557,923 | 1/1971 | Nickell | 192/106.2 X |
| 4,190,142 | 2/1980 | Berlioux | 192/106.2 |
| 4,351,167 | 9/1982 | Hanke et al. | 192/106.2 X |
| 4,483,684 | 11/1984 | Black | 192/106.2 X |
| 4,485,909 | 12/1984 | Gatewood | 192/106.2 |

FOREIGN PATENT DOCUMENTS

| | | | |
|---|---|---|---|
| 605745 | 9/1960 | Canada | 192/21.5 |
| 1400382 | 10/1968 | Fed. Rep. of Germany | |
| 1149645 | 12/1957 | France | |
| 94640 | 4/1983 | Japan | |
| 65333 | 4/1983 | Japan | |

*Primary Examiner*—Rodney H. Bonck
*Assistant Examiner*—David A. Testardi
*Attorney, Agent, or Firm*—Oblon, Fisher, Spivak, McClelland & Maier

[57] ABSTRACT

A magnetic particle type electromagnetic coupling apparatus comprises a first coupling body having a coupling surface at its inner circumferential part, a second coupling body constituted by two members divided in the axial direction which is placed inside the coupling surface of the first coupling body and has a coupling surface connectable to the coupling surface of the first coupling body, magnetic particles filled between the coupling surfaces, an electromagnetic coil received in the second coupling body to magnetize the magnetic particles thereby controlling connection between the coupling surfaces, a rotary body placed at the inner circumferential part of the second coupling body so as to transmit torque and a damper means which is placed between the second coupling body and the rotary body so as to transmit torque and which is sealingly held between the two members of the second coupling body.

3 Claims, 5 Drawing Figures

MAGNETIC PARTICLE TYPE ELECTROMAGNETIC COUPLING APPARATUS

The present invention relates to a magnetic particle type electromagnetic coupling apparatus. More particularly, it relates to a magnetic particle type electromagnetic coupling apparatus usable as a clutch for cars.

There has been known as a conventional apparatus one disclosed in Japanese unexamined patent publication No. 65333/1983 for decreasing variations in torque which causes vibrations in a car, by mounting a damper in a magnetic particle type coupling apparatus.

In the apparatus disclosed in Japanese unexamined patent publication No. 65333/1983, however, the damper is exposed out of a driven member on account of which magnetic particles enter into the exposing part to cause smoothless operations of the damper and much wearing of the damper. Further, decrease in the amount of the magnetic particles reduces a transmission torque.

The conventional apparatus has a construction as shown in FIG. 1, as means for transmitting torque from the driven member to the damper.

In FIG. 1, a reference numeral 1 designates a driven member of the magnetic particle type coupling apparatus. A pair of supporting plates 2, 3 are attached to the inside of the driven member by bolts 4. Collars 5 are interposed between the supporting plates 2, 3 and the bolts 4 are passed through the collar. Dampers 6 are made of resilient material and each end of them is engaged with the supporting plates 2, 3. A rotary hub 7 which is connected to a driving shaft of a speed reduction gear (not shown) receives a torque from the dampers 6 by engaging with the other end of the dampers 6. When the dampers 6 are compressed, they directly receive a torque from the driven member through the bolts 4 and the collars 5.

In the conventional apparatus having the construction as mentioned above, when a torque-transmitting force is small, the torque is transmitted to the rotary hub 7 in the course as shown by the broken line A and the one-dotted chain line B in FIG. 1, whereas when the torque-transmitting force is large, it is directly transmitted to the rotary hub 7 through the bolts 4 in the course as shown by the solid line C due to the contraction of the dampers 6. It is, therefore necessary for the bolts 4 to have a large mechanical strength because a torque always acts on the bolts 4 as the result that the diameter of the bolts 4 is large, hence the driven member 1 is large-sized.

It is an object of the present invention to eliminate the disadvantage of the conventional apparatus and to provide a magnetic particle type electromagnetic coupling apparatus of a small size and having excellent feature of preventing magnetic particles from entrance into the damper as well as preventing escape of the magnetic particles and minimizing stress applied to the connecting pieces.

The foregoing and the other objects of the present invention have been attained by providing a magnetic particle type electromagnetic coupling apparatus characterized by comprising a first coupling body having a coupling surface at its inner circumferential part, a second coupling body constituted by two members divided in the axial direction which is placed inside the coupling surface of the first coupling body and has a coupling surface connectable to the coupling surface of the first coupling body, magnetic particles filled between the coupling surfaces, an electromagnetic coil received in the second coupling body to magnetize the magnetic particles thereby controlling connection between the coupling surfaces, a rotary body placed at the inner circumferential part of the second coupling body so as to transmit torque and a damper which is placed between the second coupling body and the rotary body so as to transmit torque and which is sealingly held between the two members of the second coupling body.

Figure 1:
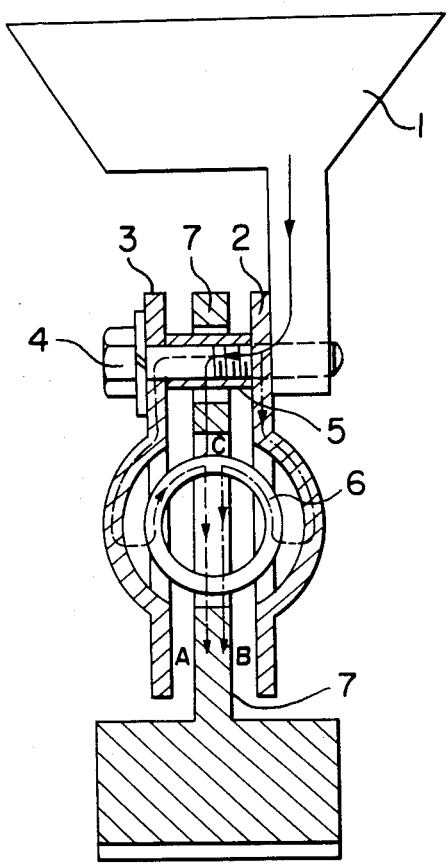
FIG. 1 is a schematic view in cross section of an important part of a conventional apparatus.
Figure 2:
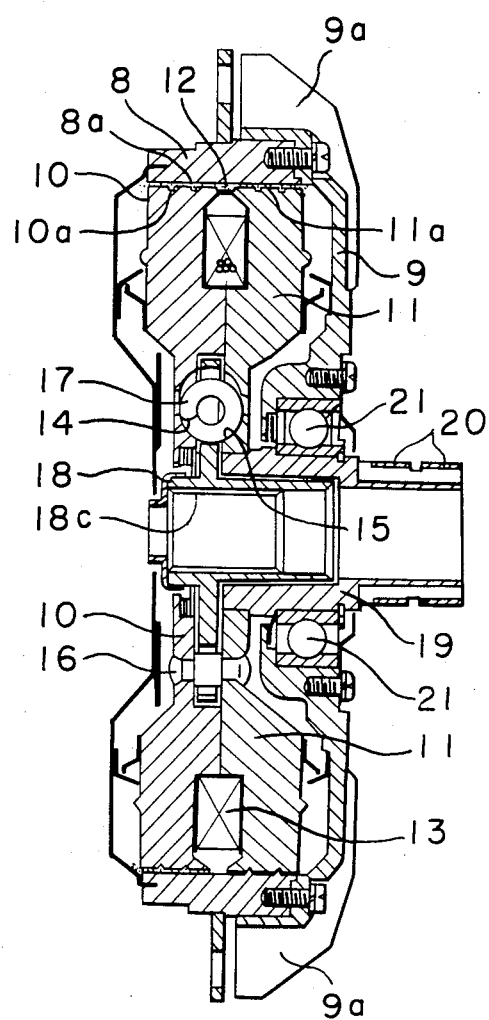
FIG. 2 is a cross-sectional view of an embodiment of the present invention.
Figure 3:
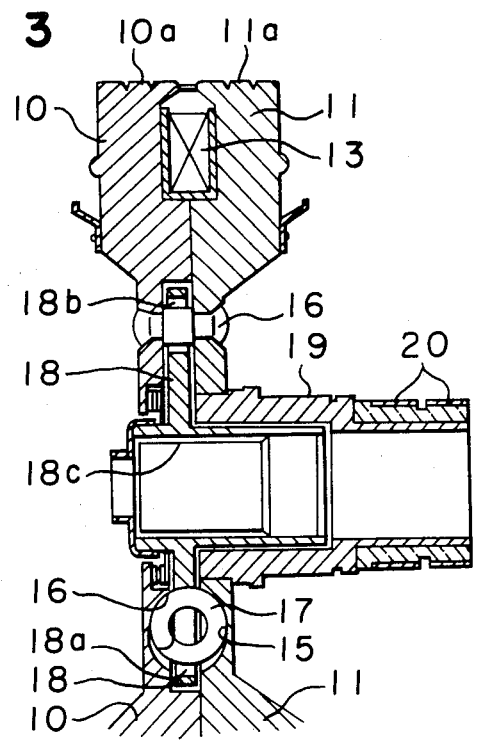
FIG. 3 is a cross-sectional view showing an important part of an embodiment of the present invention shown in FIG. 2.

An embodiment of the present invention will be described with reference to FIGS. 2 to 5.

In the Figure, a driving member 8 as a first coupling body is connected to a driving shaft of an engine (not shown) and has a coupling surface 8a at its inner circumferential part. A bracket 9 is firmly attached to a side surface of the driving member 8 and has cooling fins 9a at its outer circumferential part. A pair of driven members 10, 11 constituting a second coupling body are symmetric with respect to a plane perpendicular to the axial line of the driving shaft. The driven members 10, 11 respectively have coupling surfaces 10a, 11a at their outer circumferential parts which face the coupling surface 8a of the driving member 8 with a small air gap in the radial direction. Magnetic particles are filled between the coupling surface 8a of the driving member 8 and the coupling surfaces 10a, 11a. An electromagnetic coil is received in a cavity formed in the outer circumferential part of the driven members 10, 11 to magnetize the magnetic particles 12 to control connection between the driving member 8 and the driven members 10, 11. Four receiving recesses 14, 15 are respectively formed in the facing side surfaces of the driven members 10, 11 at substantially constant circumferential angle. Connecting pins 16 as connecting pieces pass through the driven members 10, 11 to connect their inner surfaces integrally, the connecting pins being provided in spaces between the receiving recesses 14, 15 of the driven members 10, 11 at substantially constant circumferential angle. Dampers 17 made of resiliant material are respectively received in the receiving recesses 14, 15 so as to be sealed against the outside of the driven members 10, 11. There is provided a rotary hub 18 for receiving a torque from the driven members 10, 11 through the dampers 17 or the connecting pins 16. The rotary hub 18 has four openings 18a into which dampers 17 are inserted and four elongated holes 18b through which the connecting pins 16 are passed and are movable in the circumferential direction. The rotary hub 18 is arranged to have air gaps in the radial and axial directions with respect to the driven members 10, 11. A spline portion 18c is formed in the rotary hub and is fitted to the driving shaft of the speed reduction gear (not shown). A rotor 19 is connected to the inner circumferential part of the driven member 11; slip rings 20 are attached to the rotor 19 for feeding current to the electromagnetic coil 13 and a bearing 21 is disposed between the rotor 19 and bracket 9.

The operation of the embodiment of the present invention will be described.

On actuating the engine, the driving member 8 is actuated for revolution. During deenergization of the electromagnetic coil 13, the magnetic particles 12 are not magnetized and accordingly no torque is transmitted to the driven members 10, 11 whereby only the driving member 8 is rotated. As soon as the electromagnetic coil 13 is energized, the magnetic particles 12 are magnetized to move the driven members 10, 11 for revolution whereby the rotary shaft of the speed reduction gear (not shown) is rotated through the dampers 17 and the rotary hub 18.

In the next place, detailed description as to torque-transmitting operations between the driven members 10, 11 and the rotary hub 18 in the embodiment of the present invention will be made.

Figure 4:
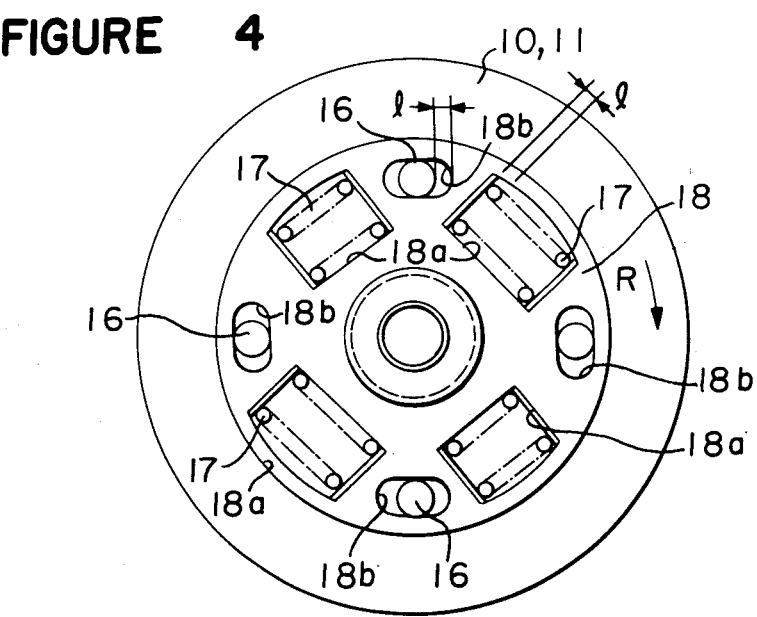
FIG. 4 is a plane view showing an important part of an embodiment shown in FIG. 2.
Figure 5:
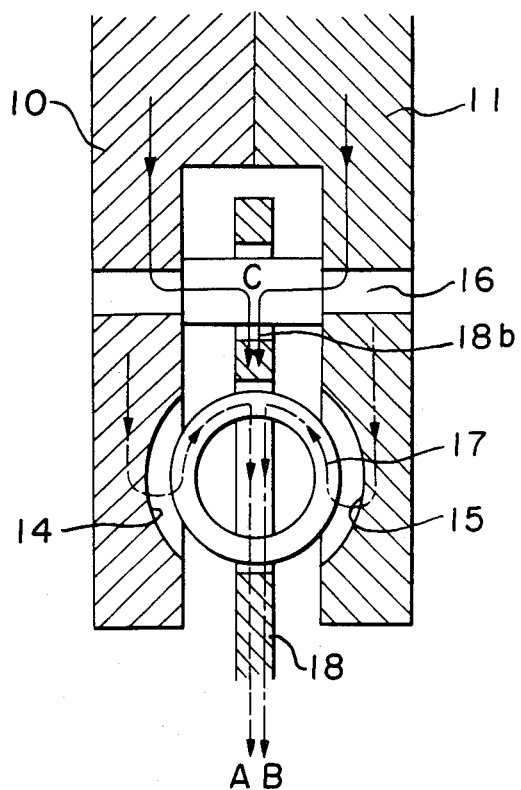
FIG. 5 is a cross-sectional view showing a course of torque transmission of the embodiment in FIG. 2.

Assuming that the driven members 10, 11 are rotated in the direction of the arrow mark R in FIG. 4. When a torque acted on the dampers by the driven members 10, 11 is smaller than a force corresponding to the distance of contraction 1 of the dampers 17, the transmission torque from the driven members 10, 11 is transmitted to the rotary hub 18 only through the dampers 17 but not through the pins 16 as shown in FIGS. 4 and 5 (the broken line A and the one-dotted chain line B in FIG. 5). On the other hand, the transmission torque becomes large to reach distance of contraction 1 of the dampers 17, the pins come to contact with the elongated holes 18b of the rotary hub 18. Accordingly, the transmission torque is transmitted to the rotary hub 18 through the connecting pins 16, but not through the dampers 17 as shown by the solid line C in FIG. 5.

Thus, no torque is directly transmitted to the connecting pins 16 for connecting the driven members 10, 11 until the connecting pins 16 come to contact with the end surface of each of the elongated holes 18b of the rotary hub 18. Further, since both ends of the connecting pins 16 are supported by the driven members 10, 11 even under the condition that the connecting pins 16 transmit a torque by contacting with the end surfaces of the elongated holes 18b, stress on the connecting pins 16 is extremely small because of the principle of bending a beam with both fixed ends. As a result, the diameter of connecting pins 16 can be small and an effective magnetic circuit formed in the driven members 10, 11 can be large to thereby contribute miniaturization of the apparatus.

In the above mentioned embodiment, entrance of the magnetic particles 12 into the dampers 17 can be prevented, hence escape of the particles 12 can be reduced since a cylindrical damper 17 of a coil spring is sealingly received in each of cylindrical recesses 14, 15.

In the embodiment, although the apparatus of the present invention is described to be used as an electromagnetic clutch, it is possible to utilize it as an electromagnetic brake.

In accordance with the present invention, the second coupling body is constituted by two members divided into two parts with respect to the axial line of the driving shaft and the dampers are sealingly received in the two members whereby entrance of the magnetic particles into the damper can be certainly prevented and escape of the magnetic particles can be reduced.

Further, connecting pieces are secured between the two members of the second coupling body in such a manner that a torque of the second coupling body is transmitted to the rotary plate only through the dampers until the dampers are compressed at a predetermined value and the torque is transmitted through the connecting pieces when the dampers are compressed with a predetermined force. Accordingly, stress applied to the connecting pieces can be reduced to one-half in comparison with the conventional apparatus, whereby the apparatus can be operated effectively and can be miniaturized.

We claim:

1. A magnetic particle type electromagnetic coupling apparatus characterized by comprising a first coupling body having a coupling surface at its inner circumferential part, a second coupling body constituted by two members divided in the axial direction which is placed inside the coupling surface of said first coupling body and has a coupling surface connectable to said coupling surface of said first coupling body, magnetic particles filled between said coupling surfaces, an electromagnetic coil received in said second coupling body to magnetize said magnetic particles thereby controlling connection between said coupling surface, a rotary body including a rotary plate placed at the inner circumferential part of said second coupling body and extending between said two members of the second coupling body with predetermined air gaps and having elongated holes extending in the circular direction at parts facing said two members, connecting pieces passing through said elongated holes to connect said two members of the second coupling body to said rotary plate, so as to transmit torque, said connecting pieces being supported at both ends by said members so as to reduce the stress on said connecting means and a damper means which is placed between said second coupling body and said rotary body so as to transmit torque and which is sealingly held between said two members of said second coupling body, wherein torque is transmitted only through said dampers until said dampers are compressed by a predetermined amount and then torque is transmitted through said connecting pieces, so as to reduce stress on said connecting pieces.

2. The magnetic particle type electromagnetic coupling apparatus according to claim 1, wherein said damper is constituted by coil springs.

3. The magnetic particle type electromagnetic coupling apparatus according to claim 1, wherein coil springs and said elongated holes are respectively provided at four positions in the circular direction of said rotary body.

* * * * *